March 25, 1930. W. FISCHER 1,751,804
EXTENSION HOLDER FOR EYEGLASSES
Filed Jan. 21, 1929
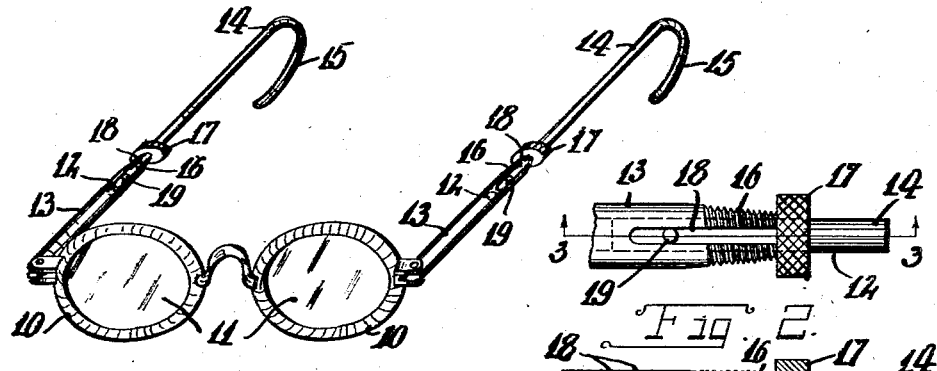
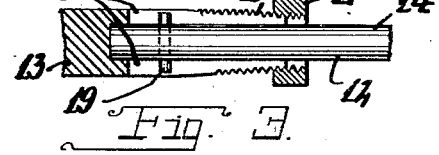
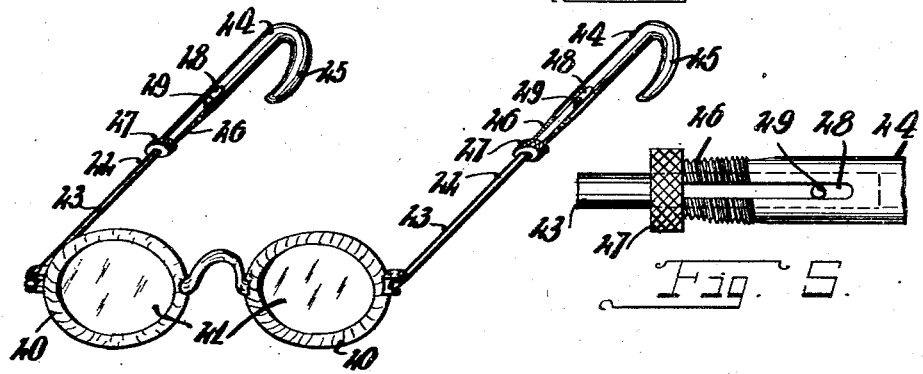
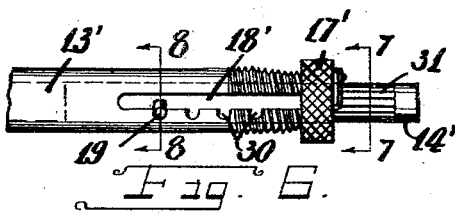
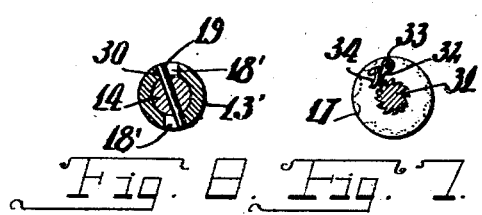
INVENTOR.
WILLIAM FISCHER.

Patented Mar. 25, 1930

1,751,804

UNITED STATES PATENT OFFICE

WILLIAM FISCHER, OF NEW YORK, N. Y.

EXTENSION HOLDER FOR EYEGLASSES

Application filed January 21, 1929. Serial No. 333,837.

This invention relates generally to eyeglasses and has more particular reference to a novel extension holder for eye-glasses.

The invention has for an object the provision of a device of the class mentioned which is of simple durable constuction, desirable in use and efficient in action and which can be manufactured and sold at a reasonable cost.

The invention proposes the use of temple bars formed of two sections telescopically arranged, the front sections being connected with lens frames, and the rear sections being formed with ear engaging members, and a means being provided for holding these sections in relative longitudinal and rotative adjusted positions. One of the temple sections is formed with opposite elongated slots engaged by a transverse pin secured in the other of the sections. The larger of the sections is formed with an external tapered thread engaged by a nut for locking the sections in fixed positions.

For further comprehension of the invention, and of the objects and advantages thereof, reference will be had to the following description and accompanying drawings, and to the appended claims in which the various novel features of the invention are more particularly set forth.

Referring to the accompanying drawing, forming a material part of this disclosure:—

Fig. 1 is a perspective view of the device constructed according to this invention.

Fig. 2 is a fragmentary plan view of a portion of one of the temple bars shown in Fig. 1.

Fig. 3 is a sectional view taken on the line 3—3 of Fig. 2.

Fig. 4 is a perspective view similar to Fig. 1, but disclosing a modified form thereof.

Fig. 5 is a fragmentary plan view of a portion of the temple bar shown in Fig. 4.

Fig. 6 is a view similar to Fig. 2, but disclosing a modified form thereof.

Fig. 7 is a sectional view, taken on the line 7—7 of Fig. 6.

Fig. 8 is a sectional view, taken on the line 8—8 of Fig. 6.

The reference numeral 10 indicates generally an eye-glass frame provided with lenses 11, and temple bars 12 pivotally connected with said lens frame 10.

Each of the temple bars 12 consist of a front section 13 and a rear section 14, telescopically arranged, the front section being the larger section, and section 14 engaging therein. The rear section 14 is formed with an ear engaging member 15.

The front section 13 of the temple bars is formed with a tapered external thread 16 engaged by a nut 17 for clamping the sections together in fixed positions. Elongated opposite slots 18 are formed in the temple bar section 13 and are engaged by a transverse pin 19 fixed in the rear section 14. This arrangement permits longitudinal adjustment of the sections relative to each other while prohibiting rotative movements thereof. This is of particular advantage in that the ear engaging member 15 may always be disposed in the proper plane.

In the modified form of the device illustrated in Figs. 4 and 5 a lens frame 20 has been shown provided with lenses 21, and with temple bars 22. These temple bars consist of a front section 23 and a rear section 24. The rear section is provided with ear engaging members 25, and with a front tapered threaded end 26 engaged by a nut 27 for clamping the sections in fixed positions.

The rear section 24 is provided with opposite elongated slots 28 engaged by a transverse pin 29 projecting from the front section 23.

In operation of the device the nuts may be loosened for permitting longitudinal adjustment of the sections forming the temple bars so that the glasses may be properly engaged upon a wearer. After a proper adjustment has been made the nuts may be tightened for insuring the maintenance of said adjustments.

In the modified form of the device illustrated in Figs. 6, 7 and 8, the section 13' is formed with elongated opposite slots 18' having a plurality of opposite recesses 30 communicating therewith, and temple section 14' engages in the section 13'. A nut 17' threadedly engages upon a tapered threaded end of the section 13' for clamping the two sections together. The section 14' is provided with a transverse pin 19 engageable in the slots 18' or in any one of the recesses 30. The section 14' is provided with ratchet teeth 31 engaged by a pawl 32 pivoted at one end as at 33 and urged into engagement by a spring 34 fixed upon the nut 17. The pawl 32 is mounted upon the nut 17.

The ratchet teeth 31 should be directed in such a direction that when the nut 17 is turned upon the threads formed on the section 13' the pawl 32 engages the ratchet teeth 31 for preventing a loosening of the nut. In operation the nut may be loosened by manually lifting the pawl 31. Then the sections may be adjusted with the transverse pin 19 engaged in a desired recess 30. Next the nut 17 is tightly engaged upon the threaded end of the section 13', and the pawl 32 engages the ratchet teeth 31 of the section 14' for preventing a loosening of the nut 17.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. An extension holder for eye-glasses, comprising a frame for supporting eye-glass lenses, temple bars connected therewith, each temple bar being of two sections, telescopically engaged with each other and arranged for assuming various extended positions, one of said sections being formed with elongated slots and recesses communicating with the slots, and the other with a transverse pin engaging the slots for holding the sections against relative turning, and engageable in the recesses for aiding in holding the sections against longitudinal relative movements.

2. An extension holder for eye-glasses, comprising a frame for supporting eye-glass lenses, temple bars connected therewith, each temple bar being of two sections telescopically engaged with each other and arranged for assuming various extended positions, one of said sections being formed with elongated slots and recesses communicating with the slots, and the other with a transverse pin engaging the slots for holding the sections against relative turning, and engageable in the recesses for aiding in holding the sections against longitudinal relative movements, a nut being threadedly engaged on a tapered portion of one of said sections, and provided with a spring pressed pawl engaging in ratchet teeth formed in the other section.

3. An extension holder for eye-glasses, comprising a frame for supporting eye-glass lenses, temple bars connected therewith, each temple bar being of two sections, telescopically engaged with each other and arranged for assuming various extended positions, one of said sections being formed with elongated slots and recesses communicating with the slots, and the other with a transverse pin engaging the slots for holding the sections against relative turning, and engageable in the recesses for aiding in holding the sections against longitudinal relative movements, and means for normally holding the sections against relative movements for holding the transverse pin from moving from in the recesses to in the slots.

In testimony whereof I have affixed my signature.

WILLIAM FISCHER.